United States Patent
Nevarez et al.

(10) Patent No.: US 8,109,202 B2
(45) Date of Patent: *Feb. 7, 2012

(54) COOKING APPARATUS AND METHOD WITH PRODUCT RECOGNITION

(75) Inventors: Roberto Nevarez, Hudson, FL (US); Douglas S. Jones, New Port Richey, FL (US); Jan Claesson, Land O' Lakes, FL (US); Ryan J. Stephens, Dallas, PA (US); David W. Harter, New Port Richey, FL (US)

(73) Assignee: Enodis Corporation, New Port Richey, FL (US)

( * ) Notice: Subject to any disclaimer, the term of this patent is extended or adjusted under 35 U.S.C. 154(b) by 1634 days.

This patent is subject to a terminal disclaimer.

(21) Appl. No.: 11/070,348

(22) Filed: Mar. 2, 2005

(65) Prior Publication Data
US 2005/0193897 A1 Sep. 8, 2005

Related U.S. Application Data

(60) Provisional application No. 60/549,233, filed on Mar. 2, 2004.

(51) Int. Cl.
*A47J 27/62* (2006.01)

(52) U.S. Cl. ............................................. 99/349; 99/372

(58) Field of Classification Search ............ 99/327–334, 99/349–351, 348, 372–391, 400, 401, 444–446, 99/485; 426/520–523; 219/521–525, 386
See application file for complete search history.

(56) References Cited

U.S. PATENT DOCUMENTS

| | | | | |
|---|---|---|---|---|
| 3,948,159 A | * | 4/1976 | Vigerstrom | 99/358 |
| 4,483,239 A | * | 11/1984 | Mueller et al. | 99/340 |
| 4,627,335 A | | 12/1986 | Sherman et al. | 99/325 |
| RE32,994 E | | 7/1989 | Adamson et al. | 99/332 |
| 5,473,976 A | | 12/1995 | Hermansson | 99/349 |
| 5,555,794 A | | 9/1996 | Templeton et al. | 99/349 |
| 5,847,365 A | | 12/1998 | Harter et al. | 219/492 |
| 5,934,182 A | | 8/1999 | Harter et al. | 99/349 |
| 6,016,743 A | | 1/2000 | Galvan | 99/349 |
| 6,079,321 A | | 6/2000 | Harter et al. | 99/349 |

(Continued)

FOREIGN PATENT DOCUMENTS

JP 57114342 A 7/1982

(Continued)

OTHER PUBLICATIONS

Supplementary European Search Report dated Mar. 4, 2008 based on EP application No. EP05724290.

(Continued)

*Primary Examiner* — Quang Van
(74) *Attorney, Agent, or Firm* — Ohlandt, Greeley, Ruggiero & Perle, L.L.P.

(57) ABSTRACT

Cooking apparatus having first and second platens with product recognition. A positioning mechanism moves the second platen toward the first. A detector senses the second platen making contact with a food product disposed on the first platen and provides a signal. A controller uses the signal to measure the travel distance of the second platen. The product thickness is a function of the travel distance, which is used to select a cooking procedure for the food product. The controller then executes the selected cooking procedure to cook the food product. The detector can include a micro switch, proximity sensor, touch sensor, strain sensor, thermal sensor, optical sensor, sonar sensor or positioning load change sensor.

21 Claims, 10 Drawing Sheets

U.S. PATENT DOCUMENTS

| | | | |
|---|---|---|---|
| 6,148,718 A | 11/2000 | D'Alterio | 99/349 |
| 6,201,218 B1 | 3/2001 | Chandler et al. | 219/388 |
| 6,263,786 B1 * | 7/2001 | Raio et al. | 99/349 |
| 6,281,478 B2 | 8/2001 | Chandler et al. | 219/388 |
| 6,401,601 B1 * | 6/2002 | Wu | 99/331 |

FOREIGN PATENT DOCUMENTS

| | | |
|---|---|---|
| JP | 64-40017 | 3/1989 |
| JP | 8202451 A | 8/1996 |
| JP | 10-309236 | 11/1998 |
| JP | 11009466 A | 1/1999 |
| JP | 2001250462 A | 9/2001 |
| SU | 1558291 | 4/1990 |

OTHER PUBLICATIONS

International Search Report and Written Opinion dated Jul. 7, 2008 based on PCT application No. PCT/US06/09352.

International Search Report and Written Opinion dated Aug. 31, 2007 based on PCT application No. PCT/US06/21241.

Communication dated Nov. 24, 2009 issued by the Russian Federation Patent Office in corresponding Russian Patent Application No. 2007138008/12.

English translation of Communication dated Feb. 14, 2011 from the Japanese Patent Office in corresponding Patent Application No. 2007-501933.

* cited by examiner

Beam can move downward after platen casing and platen stop on product. Fastener is mounted to platen cover, and floats in Beam allowing travel of beam Platen motion to be stopped by product.

COOKING APPARATUS AND METHOD WITH PRODUCT RECOGNITION

RELATED APPLICATION

This application claims the benefit of U.S. Provisional Patent Application Ser. No. 60/549,233, filed on Mar. 2, 2004.

FIELD OF THE INVENTION

This invention relates to a cooking apparatus and method in which the relative motion of two platens is automatically controlled.

BACKGROUND OF THE INVENTION

Cooking apparatus that includes two surfaces generally cooks by contacting opposed sides of a food product. Cooking apparatus of this type has been used in a variety of cooker styles. For example, a clam grill uses a lower platen and an upper platen that is moveable toward and away from the lower platen. Examples of clam grills are disclosed in U.S. Pat. Nos. 6,079,321 and Re 32,994. Another style is a toaster in which one surface is a platen and the other surface is a conveyor belt. The conveyor belt and the platen can be either horizontal, vertical or at an angle therebetween. Examples of toasters are disclosed in U.S. Pat. Nos. 6,201,218 and 6,281,478.

These known cooking apparatuses generally include a motion mechanism that either manually or automatically moves one platen toward another until opposed sides of the food product are contacted by the platens. For example, the clam grill disclosed in U.S. Pat. No. 6,079,321 automatically controls the motion based on a set of parameters that must be input to a controller for each type of food product. These parameters include a preset gap distance, which is the cooking distance between the two platens to accommodate food products of different thicknesses. These gap distances are set by manually inputting the preset gap distance setting into the grill control and assigning the setting to a gap button on the user interface control along with a cooking time. This set of cooking parameters (gap distance and cooking time) must be preselected before placing the food product on the grill surface.

The clam grill operator must also input the type of food product being cooked so that the controller uses the parameter set for that food product. Should the operator inadvertently input the wrong type, the upper platen may not contact the food product or may put too much pressure on the food product. Since the parameter set also includes the cook time for the food product type, the food product could be undercooked or over cooked. Thus, there is opportunity for human error at the time of entry of the preset gap distances as well as at the time of selecting the type of food being cooked.

There is a need for a cooking apparatus that automatically controls the relative motion of the two platens in a manner that avoids user error.

SUMMARY OF THE INVENTION

A cooking apparatus of the present invention comprises a first platen and a second platen disposed in spaced apart relationship to one another. A positioning mechanism moves the second platen toward and/or away from the first platen. A detector is disposed to provide a signal as the second platen makes contact with a food product disposed on the first platen. A controller responds to the signal to move the positioning mechanism and/or the second platen into a cooking position in relation to the food product.

The detector comprises a device that is selected from the group consisting of: micro switch, proximity sensor, touch sensor, strain sensor, thermal sensor, optical sensor and sonar sensor.

In another embodiment of the cooking apparatus of the present invention, the second platen stops upon contact with the food product and a motion of the positioning mechanism continues after the second platen stops due to initial contact with the food product.

In another embodiment of the cooking apparatus of the present invention, the continued motion of the positioning mechanism is due to a float of the positioning mechanism relative to the second platen. In one exemplary embodiment, a fastener that connects the positioning mechanism and the second platen in a manner that provides the float.

In another embodiment of the cooking apparatus of the present invention, the detector is disposed on the positioning mechanism, the second platen and/or a support of the first platen.

In another embodiment of the cooking apparatus of the present invention, the positioning mechanism comprises a member that connects with the second platen, and wherein the detector is a proximity sensor disposed on the member.

In another embodiment of the cooking apparatus of the present invention, the positioning mechanism comprises a motor responsive to the controller to move the second platen. The detector provides the signal in response to a change in load on the motor.

In another embodiment of the cooking apparatus of the present invention, the motor is an electric motor. The detector comprises a sensor disposed to monitor a motor current of the motor and provide the signal in response to a change of the motor current.

In another embodiment of the cooking apparatus of the present invention, the controller is capable of causing an additional predetermined movement to the second platen toward and/or away from the first platen.

In another embodiment of the cooking apparatus of the present invention, the signal is provided when the second platen is moved toward the first platen by the positioning mechanism.

In another embodiment of the cooking apparatus of the present invention, the cooking apparatus is a clam grill.

In another embodiment of the cooking apparatus of the present invention, a first platen and a second platen are disposed in spaced apart relation to one another. A positioning mechanism moves the second platen toward and/or away from the first platen. A controller is responsive to the second platen making contact with a food product disposed on the first platen when the second platen is moved by the positioning mechanism toward the first platen to recognize the food product due to its thickness and to select one of a plurality of cook procedures corresponding to the recognized food product.

In another embodiment of the cooking apparatus of the present invention, the recognized thickness is derived from a travel distance of the second platen.

In another embodiment of the cooking apparatus of the present invention, the travel distance is derived from a predetermined reference point and a non-cooking position of the second platen.

In another embodiment of the cooking apparatus of the present invention, a detector is disposed to provide a signal as the second platen, when moved by the positioning mechanism toward the first platen, makes contact with the food product disposed on the first platen. The controller responds to the signal to recognize the food product.

In another embodiment of the cooking apparatus of the present invention, the controller matches the recognized thickness with a corresponding thickness of a plurality of predetermined thicknesses and selects the cook procedure based on the match.

In another embodiment of the cooking apparatus of the present invention, if the recognized thickness is in-between two of the predetermined thicknesses, the controller selects one of the two predetermined thicknesses that is closest to the recognized thickness.

In another embodiment of the cooking apparatus of the present invention, the predetermined thicknesses are comprised of a plurality of thickness windows. The controller matches the recognized thickness to one of the thickness windows and uses the matched thickness window for selecting the cook procedure.

In another embodiment of the cooking apparatus of the present invention, if the recognized thickness falls in-between two of the thickness windows, the controller uses that one of the two thickness windows that is closest to the recognized thickness for selecting the cook procedure.

A method of the present invention cooks a food product in a cooking apparatus that has first and second platens. The method comprises moving the second platen toward the first platen. In response to the second platen making contact with a food product disposed on the first platen, the food product is recognized due to its thickness. Based on the recognized food product, one of a plurality of cook procedures is selected to cook the food product.

In another embodiment of the method of the present invention, the thickness is derived from a travel distance of the second platen.

In another embodiment of the method of the present invention, the travel distance is derived from a predetermined reference point and a non-cooking position of the second platen.

In another embodiment of the method of the present invention, a signal is provided as the second platen, when moved by the positioning mechanism toward the first platen, makes contact with the food product. The signal is used to recognize the food product due to its thickness.

In another embodiment of the method of the present invention, the selecting step matches the thickness of the recognized food product with a corresponding thickness of a plurality of predetermined thicknesses and selects the cook procedure based on the match.

In another embodiment of the method of the present invention, if the recognized thickness is in-between two of the predetermined thicknesses, the selecting step selects one of the two predetermined thicknesses that is closest to the recognized thickness.

In another embodiment of the method of the present invention, the predetermined thicknesses are comprised of a plurality of thickness windows. The selecting step matches the recognized thickness to one of the thickness windows and uses the matched thickness window for selecting the cook procedure.

In another embodiment of the method of the present invention, if the recognized thickness falls in-between two of the thickness windows, the selecting step uses that one of the two thickness windows that is closest to the recognized thickness for selecting the cook procedure.

In another embodiment of the method of the present invention, a second platen is positioned to a cooking position for the cooking of a food product disposed on a first platen. The method comprises moving the second platen toward and/or away from the first platen. A signal is provided as the second platen makes contact with the food product. In response to the signal, the second platen is brought to a cooking position in relation to the food product.

In another embodiment of the method of the present invention, the signal is provided by a detector.

The detector comprises a device that is selected from the group consisting of: micro switch, proximity sensor, touch sensor, strain sensor, thermal sensor, optical sensor and sonar sensor.

In another embodiment of the method of the present invention, the detector is disposed on a positioning mechanism of the cooking apparatus, the second platen and/or a support of the first platen.

In another embodiment of the method of the present invention, the detector is a proximity sensor disposed on a member of a positioning mechanism of the cooking apparatus.

In another embodiment of the method of the present invention, the moving step uses a motor responsive to a drive signal to move the second platen. The detector provides the signal in response to a change in load on the motor.

In another embodiment of the method of the present invention, the motor is an electric motor. The detector comprises a sensor disposed to monitor a motor current of the motor and provide the signal in response to a change of the motor current.

In another embodiment of the method of the present invention, the moving step uses a positioning mechanism to move the second platen and the bringing step brings the positioning mechanism and/or the second platen to the cooking position.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

It is contemplated that the present invention can be used in various styles of two-surfaced cooking apparatus, for example, two-sided contact toasting, clam grills and the like. However, by way of example and completeness of description, the present invention will be described herein in a clam grill embodiment.

Figure 1:
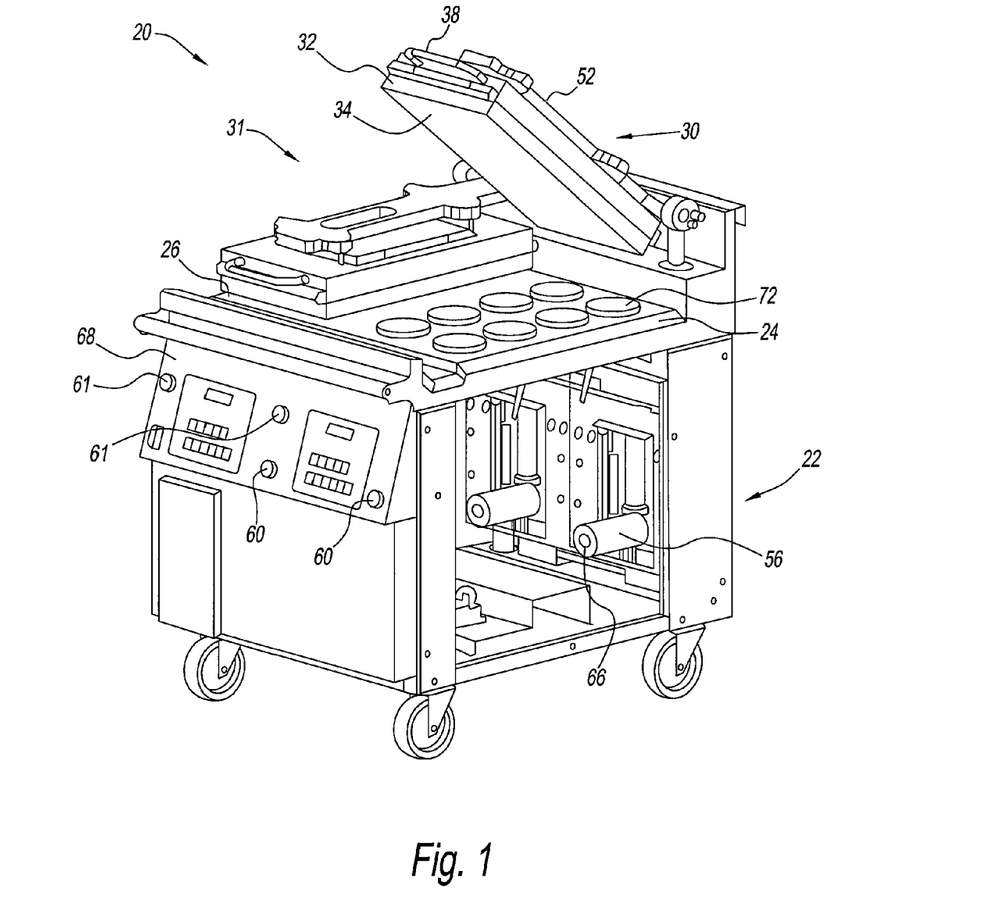
FIG. 1 is a perspective view of one embodiment of a two-surfaced cooking apparatus of the present invention.
Figure 2:
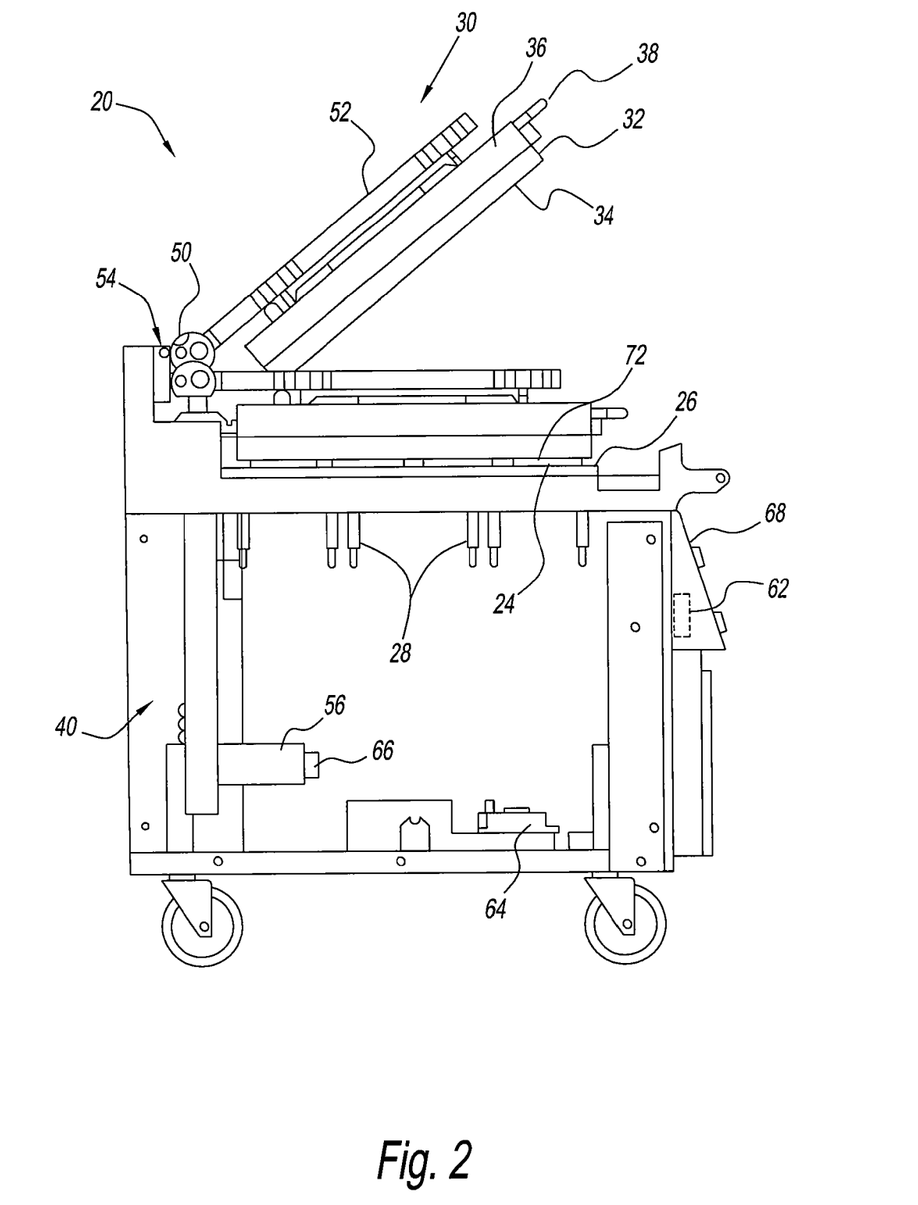
FIG. 2 is a side view of the two-surfaced cooking apparatus of FIG. 1.
Figure 3:
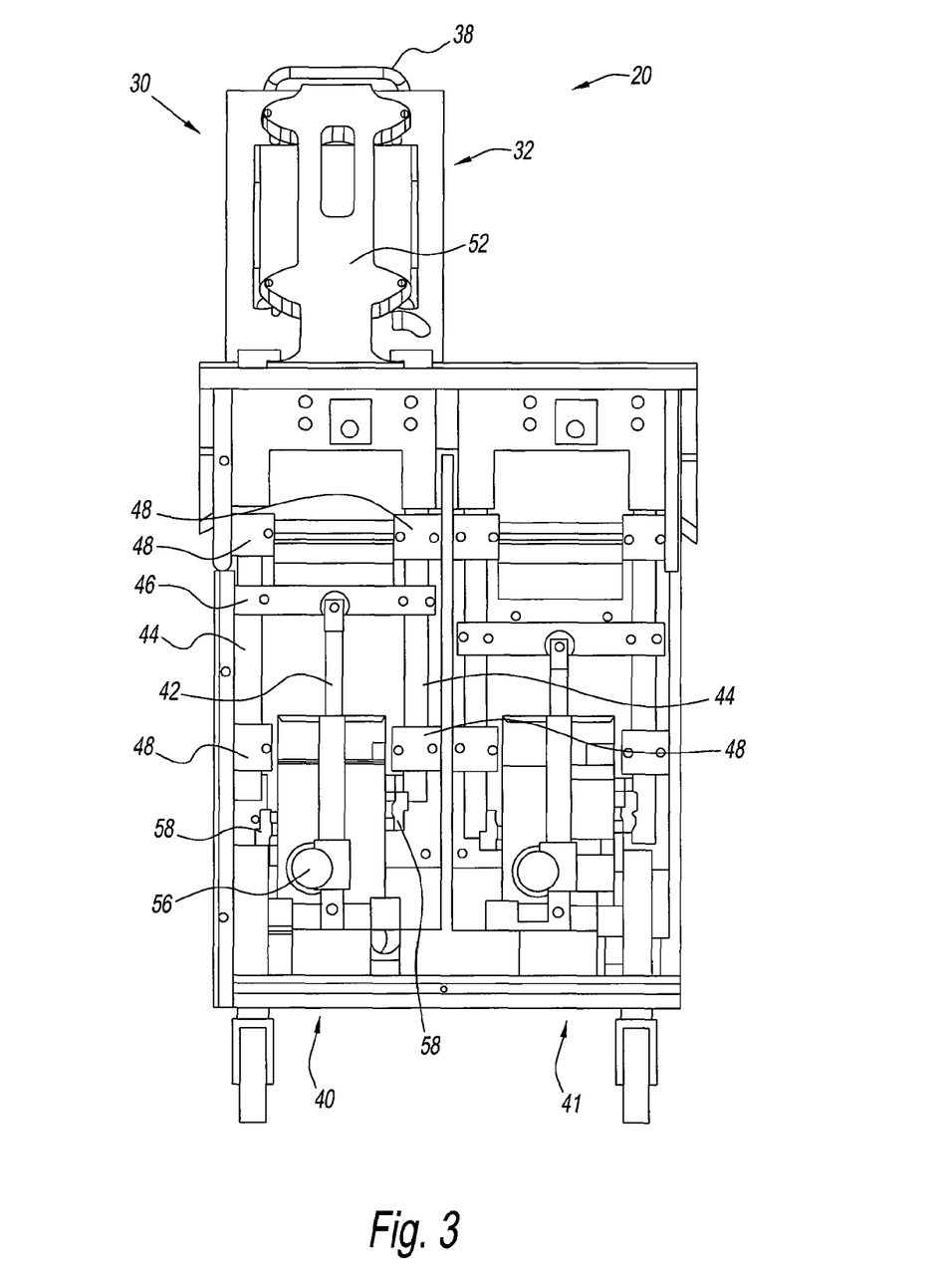
FIG. 3 is a rear view of the two-surfaced cooking apparatus of FIG. 1.

Referring to FIGS. 1-3, a two-surfaced cooking apparatus of the present invention comprises a support structure 22 to which a lower (first) cooking platen 24 is horizontally mounted. Lower platen 24 has a smooth level cooking surface 26 on its upper side. Lower platen 24 is heated to cooking temperature by gas or electric means via heating elements 28 or equivalent gas burners.

A platen assembly 30 and a platen assembly 31 are movably mounted to the rear of support structure 22 by a positioning mechanism 40 and a positioning mechanism 41, respectively. As platen assembly 30 and platen assembly 31 are substantially identical, only platen assembly 30 will be described in detail. Platen assembly 30 comprises an upper (second) cooking platen 32 that has a surface 34. Preferably, surface 34 is heated to cooking temperature by heating elements (not shown) mounted within a casing 36. Upper platen 32 is either smaller than or equivalently sized to lower cooking platen 24. A handle 38 mounted on the front side of platen assembly 30 for manual manipulation thereof. Cooking apparatus 20 may have one or more upper platen assemblies. Although two upper platen assemblies are shown, other embodiments may have one or more than two upper platen assemblies. In a preferred embodiment, two or more separate upper platen assemblies are mounted over a single lower platen, allowing for greater flexibility for the cook/operator. Although lower platen 24 is shown as a single platen, it can be two or more platens in alternate embodiments.

Cooking apparatus 20 further includes a controller 62 (shown in FIG. 2) that is interconnected with heaters 28, a motor controller 64, a user interface 68 and one or two activation buttons 60. Controller 62 controls the cook cycle of cooking apparatus 20 and in so doing controls motor controller 64 and positioning mechanism 40 that imparts motion to platen assembly 30. User interface 68 includes a display and various user controls. Activation buttons 60 are disposed on the front of cooking apparatus for user control of platen assembly 30. Activation buttons 61 are disposed on the front of cooking apparatus for user control of platen assembly 31.

As positioning mechanism 40 and positioning mechanism 41 are substantially identical, only positioning mechanism 40 will be described in detail. Positioning mechanism 40 facilitates two distinct motions by platen assembly 30 between an uppermost or non-cooking position (see FIG. 3) to a cooking position. In FIGS. 1-3, platen assembly 30 is in the non-cooking position and platen assembly 31 is in the cooking position. In this embodiment, positioning mechanism 40 includes a linear actuator 42 that is linked to two vertical reciprocating shafts 44 by an actuator cross bar linkage 46. Actuator cross bar linkage 46 is clamped to vertical reciprocating shafts 44, which run through linear motion bearings 48. Vertical reciprocating shafts 44 are affixed to arm pivot/stop heads 50. A cantilever beam 52 runs through arm pivot/stop heads 50 through rotational pivot bearings 54. When platen assembly 30 is in its uppermost rotational position, linear actuator 42 is extended to its maximum position, vertical reciprocating shafts 44 and arm pivot/stop heads 50 are extended upward and to a position which forces the back end of cantilever beam 52 to contact rotational bearings 54. In this position, platen assembly 30 is at a predetermined angle in a range of about 45 degrees to about 60 degrees from the horizontal.

Positioning mechanism 40 further comprises a drive motor 56 and position sensor switches 58 (FIG. 3). Drive motor 56 is interconnected with motor controller 64. A pulse encoder 66 is associated with motor 56 and provides a pulse train to controller 62 when motor 56 is being driven. Position switches 58 are mounted on reciprocating shafts 44 to provide position information to controller 62. In alternate embodiments, position switches 58 may be eliminated.

Prior to a cook cycle, platen assembly 30 is in its non-cooking position. In response to user activation of activation buttons 60, controller 62 initiates a cook cycle by controlling motor controller 64 to drive motor 56 to cause positioning mechanism 40 to move platen assembly 30 from the non-cooking position to a cooking position. For example, platen assembly 31 is shown in the cooking position.

Positioning mechanism 40 causes platen assembly 30 to descend both vertically and through an arc caused by the cantilever weight of platen assembly 30 maintaining contact between rotational bearings 54 and the back of cantilever beam 52. When cantilever beam 52 and platen assembly 30 become parallel with lower platen 24, the stop portion of arm pivot/stop head 50 stops the rotational motion of cantilever beam 52 causing purely vertical motion of platen assembly 30 from this point and further down toward surface 26 of lower platen 24. When upper platen 32 makes contact with a food product 72, controller 62 responds by bringing upper platen 32 to an initial cooking position and initiating a cook procedure. During the cook procedure upper platen 32 may be moved based on the requirements of the cook procedure. For example, upper platen 32 may be moved due to changed food product thickness (loss of grease or water) or for applying more or less pressure to the food product at different times during the cook procedure.

When the cook procedure is completed, controller 62 controls motor controller 64 to drive linear actuator 42 to move platen assembly 30 vertically upward from the cooking position to the non-cooking position. The cantilever weight of upper platen 32 maintains contact between arm pivot/stop head 50 until the back of cantilever beam 52 makes contact with rotational pivot bearing 54. This movement ensures that platen assembly 30 is constantly parallel to lower platen 24 during this stage of upper platen travel. Once cantilever beam 52 makes contact with rotational pivot bearing 54 the vertical motion is changed to rotational motion to a point where platen assembly 30 is rotated through the predetermined angle to the non-cooking position. Controller 60 causes an audible signal to be sounded (e.g., about two seconds) prior to the start of upward movement of platen assembly 30 to alert the operator of impending upper platen movement.

The present invention provides a detector that provides a trigger signal as upper platen 32 makes contact with food product 72. Controller 62 responds to the trigger signal to control motor controller 64 to cause positioning mechanism 40 to bring upper platen 32 to the initial cooking position. At this time, controller 62 begins the cooking procedure. The detector is shown herein in several different embodiments.

Figure 4:
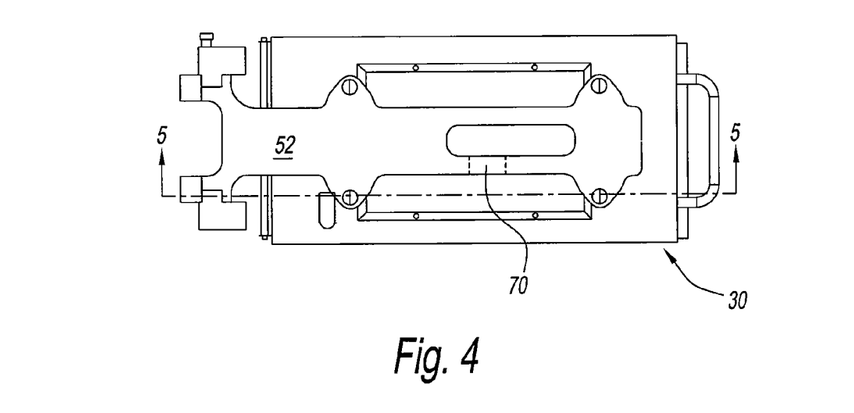
FIG. 4 is a top view of the upper platen assembly of the two-surfaced cooking apparatus of FIG. 1.
Figure 5:
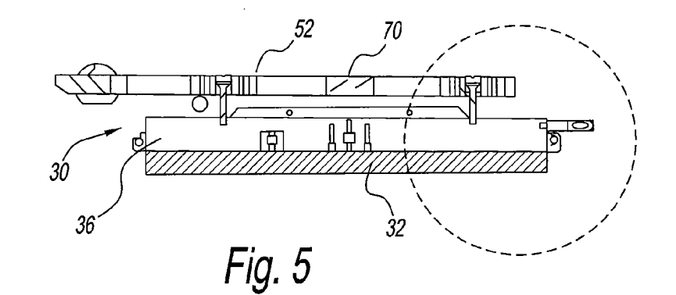
FIG. 5 is a cross-sectional view along line 5 of FIG. 4.
Figure 6:
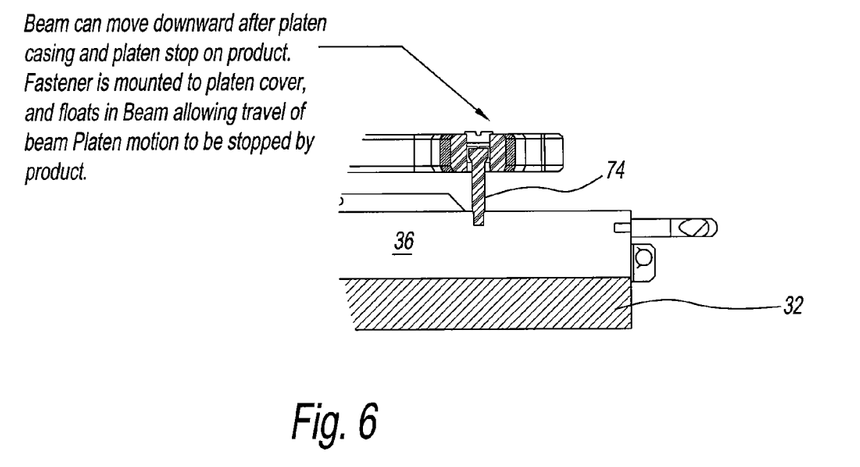
FIG. 6 is a view of detail B of FIG. 5.

Referring to FIGS. 4-6, a detector 70 is disposed or attached to cantilever beam 52 of positioning mechanism 40. When upper platen 32 stops moving because it makes contact with a food product, its motion comes to a stop or continues to move based on the cooking parameters inputted into controller 62. Positioning mechanism 40 continues to move cantilever beam 52 vertically downward toward casing 36. Detector 70 senses a small change in the distance between cantilever beam 52 and casing 36 to provide the trigger signal that triggers positioning mechanism 40 to bring upper platen 32 to the initial cooking position.

Referring to FIG. 6, a fastener 74 fastens cantilever beam 52 to casing 36. Fastener 74 is mounted in cantilever beam 52 in a manner that allows it to float vertically when upper platen 32 is in contact with food product 72. Thus, when upper platen 32 makes contact with food product 72, upper platen 32 stops but cantilever beam 52 continues downwardly due to the floating action of fastener 74.

In this embodiment, detector 70 is preferably a proximity sensor, for example, model PRX+4400, available from Hermetic Switch Inc. Detector 70 may alternatively be a microswitch, for example, model E47BM530, available from Eaton/Cutler Hammer.

Detector 70 may alternatively be a touch sensor including dielectric sensing as well as piezo-electric pressure sensing. For example, the touch sensor may be model T107-A4E-073, available from Piezo Systems, Inc.

Detector 70 may alternatively be a sonar sensor that is attached to upper platen 32, lower platen 24 or support structure 22 to detect a sound change due to upper platen 32 contacting the food product. For example, the sonar sensor may be model EFR-RTQB40KS, available from Panasonic.

Although detector 70 is shown in a specific location, detector 70 can be positioned at any suitable location of cantilever beam 52 that permits detection of upper platen 32 contacting food product 72. For example, these locations include the front, back, either side, middle or other. In an alternate embodiment, detector 70 may include multiple detectors positioned at different locations.

Figure 7:
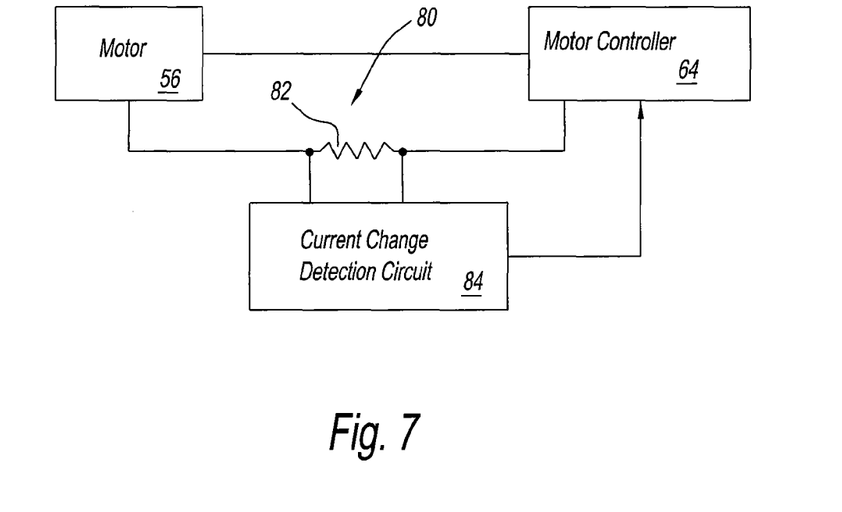
FIG. 7 is a block diagram of an alternate embodiment of the detector of the two-surfaced cooking apparatus of the present invention.

Referring to FIG. 7, a detector 80 monitors the motor current of drive motor 56. When upper platen 32 contacts food product 72, the motor current changes. Detector 80 detects this current change and signals motor controller 64. Detector 80 can either be separate from motor controller 64 or integral with motor controller 64. If integral, there is no need for detector 80 to signal motor controller 64. Detector 80 includes a current sensing resistor 82 (or other circuit for measuring current) connected in the motor current circuit. Detector 80 also includes a current change detection circuit 84 that provides the trigger signal to motor controller 64 when current change detection circuit 84 detects a change in motor current indicative of upper platen 32 making contact with food product 72. The trigger signal is supplied to controller 62.

Figure 8:
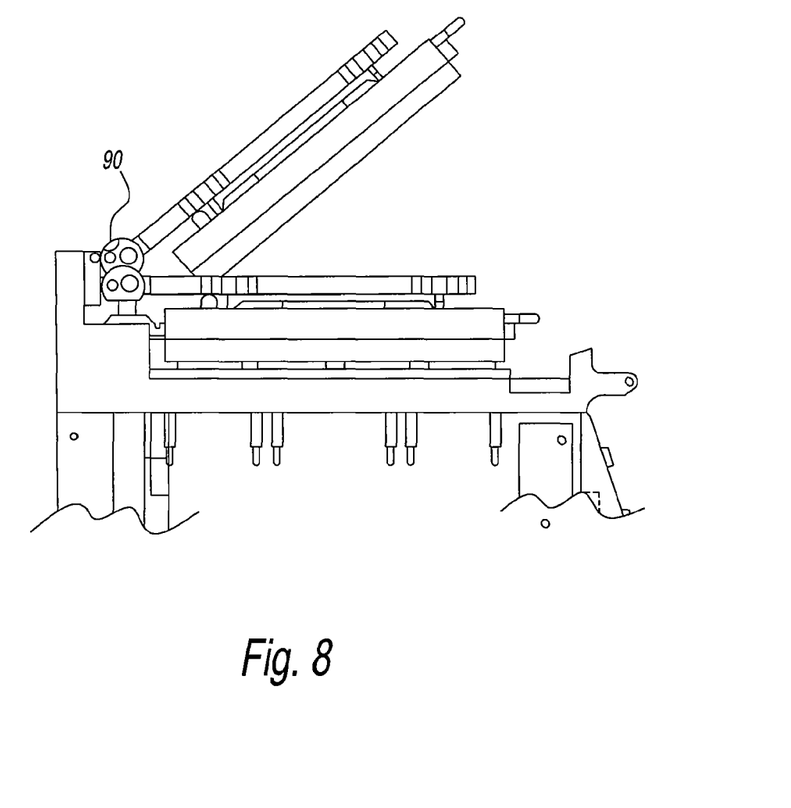
FIG. 8 is a side view of a portion of the two-surfaced cooking apparatus of FIG. 1 that depicts another embodiment of the detector.

Referring to FIG. 8, a detector 90 comprises a strain sensor attached in a location that detects a change in load after upper platen comes horizontal and when the weight of upper platen 32 is reduced by resting on food product 72. When detector 90 detects this change in strain, it provides a trigger signal to controller 62. Controller 62 then controls motor controller 64 to cause positioning mechanism 40 to bring upper platen 32 to the cooking position. Like detector 80, detector 90 may include a detection circuit (not shown) to detect when a change in the monitored strain signal is indicative of upper platen 32 making contact with food product 72.

Figure 9:
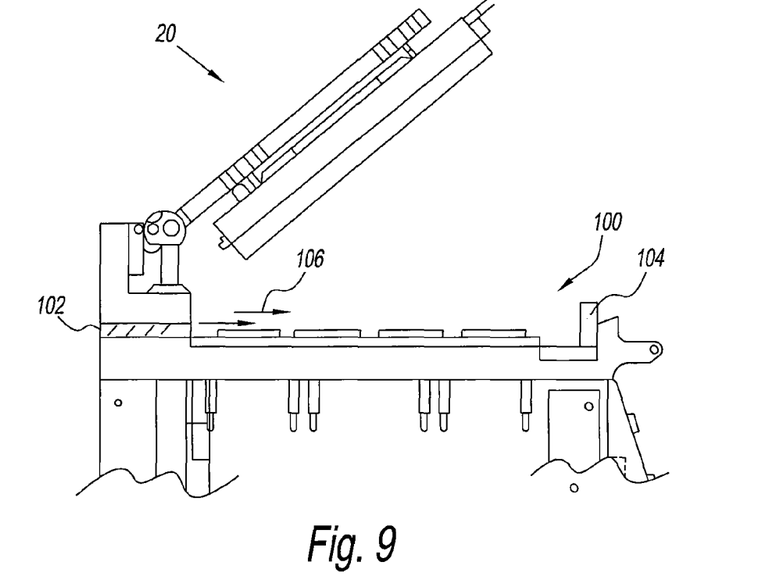
FIG. 9 is a side view of a portion of the two-surfaced cooking apparatus of FIG. 1 that depicts another embodiment of the detector.

Referring to FIG. 9, a detector 100 includes an optical transmitter 102 and an optical receiver 104 that are positioned to the rear and front, respectively, of cooking apparatus 20. Optical transmitter 102 provides an optical beam 106 from back to front at a level that will be interrupted by upper platen 32 at about the time it contacts the food product. Optical receiver 104 receives beam 106 and provides a trigger signal when upper platen 32 interrupts beam 106. Controller 62 uses the trigger signal to bring upper platen 32 to the cooking position. Optical beam 106 may be visible light or invisible, e.g., infrared.

Figure 10:
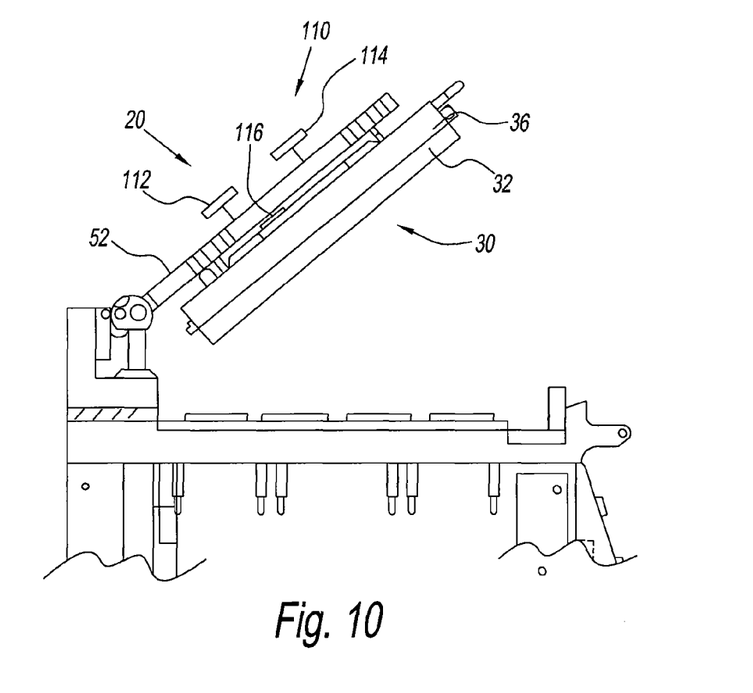
FIG. 10 is a side view of a portion of the two-surfaced cooking apparatus of FIG. 1 that depicts another embodiment of the detector.

Referring to FIG. 10, alternatively an optical detector 110 is mounted to cantilever beam 52. Thus, an optical transmitter 112 and an optical receiver 114 are mounted and spaced from one another by a gap such that a light beam emitted by optical transmitter 112 traverses the gap and is received by optical receiver 114. A shutter 116 is mounted on casing 36. When upper platen 32 is not in contact with the food product, shutter 116 is outside the gap between optical transmitter 112 and optical receiver 114. When upper platen 32 slows or stops, it contacts the food product, while cantilever beam 52 continues to move toward casing 36 such that shutter 116 enters the gap and interrupts the light beam. Optical receiver 114 responds by providing a trigger signal to controller 62. Controller 62 uses the trigger signal to bring upper platen 32 to the cooking position.

Figure 11:
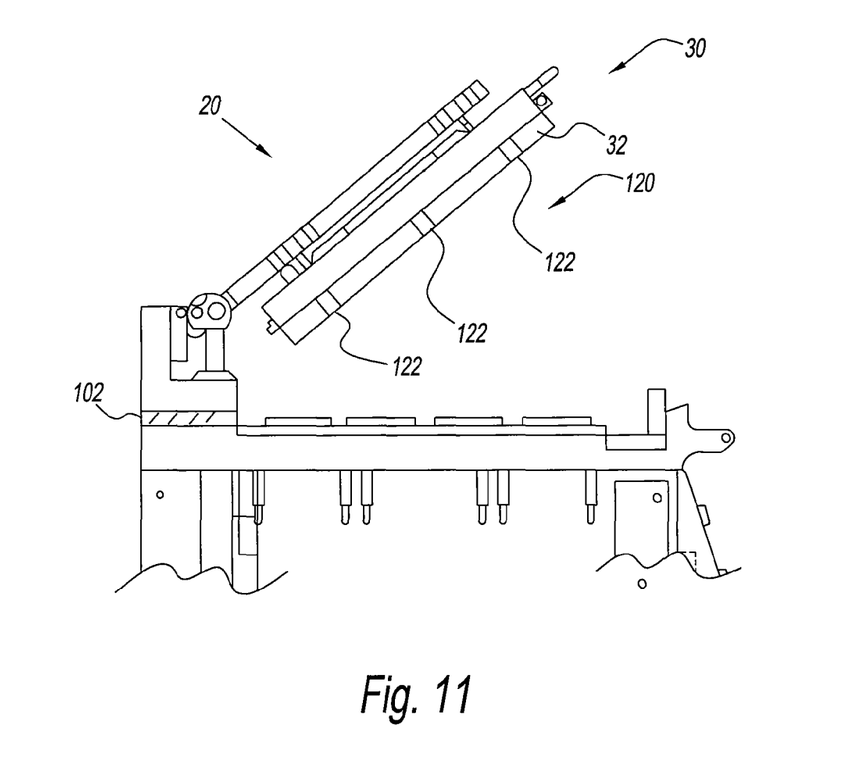
FIG. 11 is a side view of a portion of the two-surfaced cooking apparatus of FIG. 1 that depicts another embodiment of the detector.

Referring to FIG. 11, a detector 120 comprises a plurality of temperature sensors 122 disposed at various locations in upper platen 32. Temperature sensors 122 provide temperature signals to controller 62. When the operator starts a cooking cycle, controller 62 monitors the temperature sensor signals. When controller 62, based on the temperature sensor signals, determines that a given temperature drop in a specified amount of time has occurred, it controls motor controller 64 to cause positioning mechanism 40 to bring upper platen 32 to the cooking position.

It will be apparent to those skilled in the art that detection circuits can be used in any of the detectors 70, 80, 90, 100, 110 and 120 to discriminate the trigger signal from noise.

Figure 12:
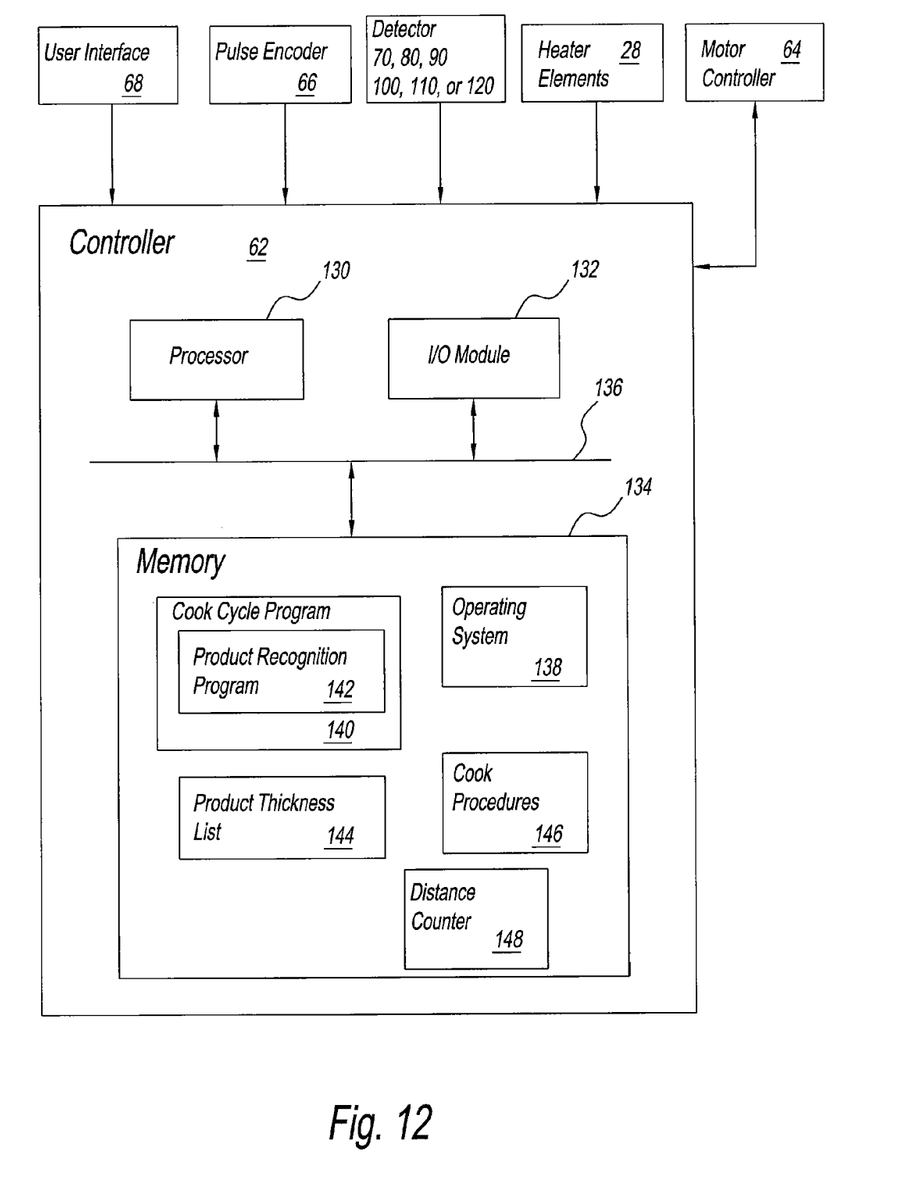
FIG. 12 is a block diagram of a preferred embodiment of the controller of the cooking apparatus of FIG. 1.

Referring to FIG. 12, controller 62 includes a processor 130 interconnected by a bus 136 with an input/output (I/O) module 132 and a memory 134. Memory 134 may be any suitable memory that includes, random access memory (RAM), read only memory (ROM), flash or other memory types or any combination thereof. Processor 130 may be any suitable processor that is capable of running programs that execute cook cycles including cook procedures. I/O module 132, contains interfaces to each of a plurality of input/output devices, including user interface 68, pulse encoder 66, detector 70, 80, 90, 100, 110 or 120, heater elements 28, motor controller 64 and any other input/output devices included in a cooking apparatus.

Memory 134 stores a plurality of programs and parameter data including a cook cycle program 140, a product thickness list 144, a set of cook procedures 146 and a distance counter 148. Cook procedures 146 include a set of cook procedures for use by cooking apparatus 20. For example, cook procedures 146 include a cook procedure for bacon, a cook procedure for a hamburger, a cook procedure for a chicken patty and so on.

A cook procedure, for example, may simply be a cook time or may also include temperatures for different portions of the cook time, different pressures and/or gap distances for upper platen at different portions of the cook time.

Cook cycle program 140 includes a product recognition program 142 that recognizes a food product 72 currently on the grill surface 26 of lower platen 24 of FIGS. 1-6. This recognition is based on a travel distance of upper platen 32 measured between a reference point to a position at which it makes contact with food product 72. When cooking apparatus 20 is first started from a cold start, a preheat mode is used before food product 72 can be placed on lower platen 24. In the preheat mode, platen assembly 30 is lowered until it comes to a stop on lower platen 24 and engages detector 70. The heaters for lower platen 24 and upper platen are turned on and the platen surfaces are heated to their preset temperatures.

After upper platen 32 has been preheated, platen assembly 30 is raised to its upper most non-cooking position to allow the operator to safely place food product 72 on lower platen 24. As platen assembly 30 begins to rise, cantilever beam 52 reaches the end of the float distance, detector 70 is released from its detected state and generates a trigger signal that controller 62 uses as the reference point. This reference point represents a reference count value, e.g., zero, of surface 26 of lower platen 24.

As platen assembly 30 continues to rise, encoder pulses are counted from the reference point to the non-cooking position. Controller 62 records the total count value from the reference point to the upper most non-cooking position, which represents a predetermined reference count value. After food product 72 is placed on lower platen 24, platen assembly 30 is again lowered. When upper platen 32 contacts food product 72, detector 70 generates a trigger signal, which controller 62 uses to record the encoder pulse count value at the time of contact with food product 72. The product thickness is represented by the difference between the pulse count value at the food product contact time and the predetermined reference count value.

It will be apparent to those skilled in the art that other techniques of measuring the travel distance can be used. For example, the travel distance can be measured by the time that elapses between current triggered count value and the reference point value. The elapsed time, for example, is measured by counting pulses from a timing source, such as a clock. This elapsed time or pulse count is recorded in distance counter 148. Product recognition program 142 uses distance to recognize a product thickness and uses the recognized product thickness to select a product cook procedure from cook procedures 146 that matches the product thickness.

Figure 13:
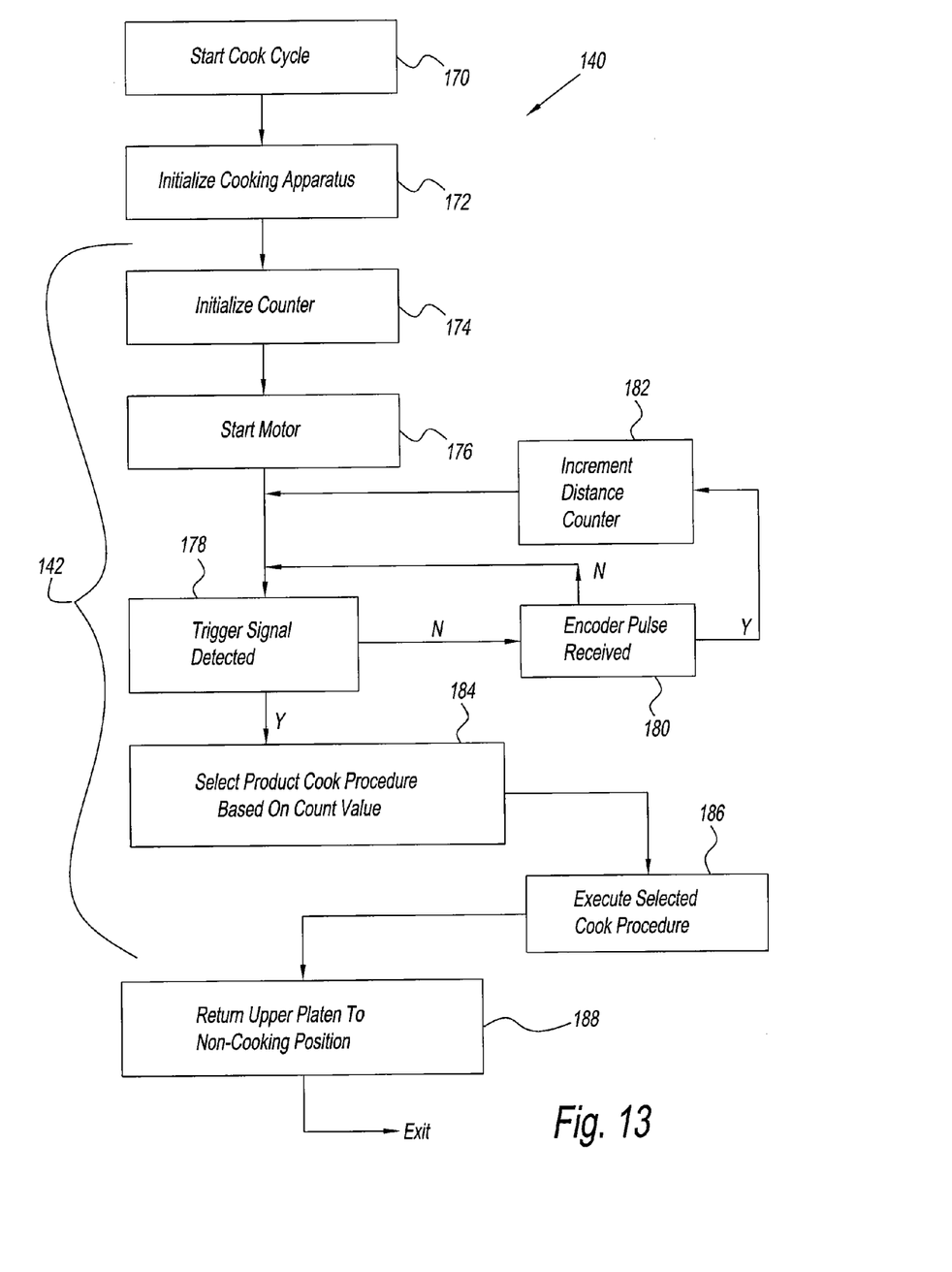
FIG. 13 is a flow diagram for the product recognition program of the controller of FIG. 12.
Figure 14:
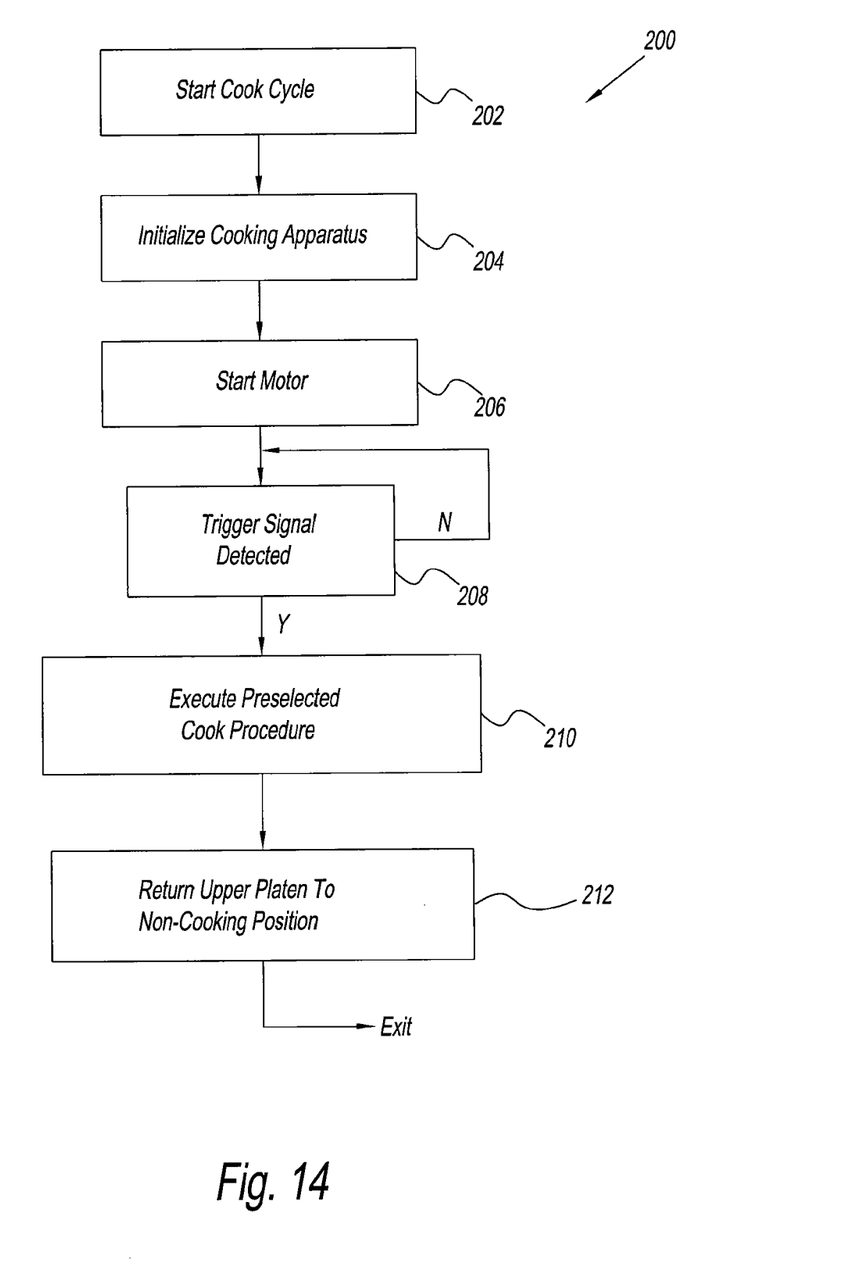
FIG. 14 is a flow diagram of another embodiment of a program that can be used with the cooking apparatus of FIG. 1.

Referring to FIG. 13, cook cycle program 140 begins at step 170 by starting a cook cycle. Step 170 is performed in response to the operator activating activation button 60. At step 172 cooking apparatus 20 is initialized. For example, heating elements 28 are turned on and other preliminary operations (not germane to the present invention) are performed. Once cooking apparatus 20 is initialized, product recognition program 142 is executed.

At step 174, distance counter 148 is initialized to a reference value, e.g., zero. At step 176 motor 56 is started. Processor 130 provides one or more command signals via I/O module 132 to motor controller 64 to provide drive current to motor 56. This causes positioning mechanism 40 to lower upper platen 32 from its non-cooking position. At step 178, there is a determination of whether a trigger signal has been received from the detector (70, 80, 110, 110 or 120). If not, at step 180 it is determined if an encoder pulse has been received. If not, control returns to step 178. If step 180 determines that an encoder pulse has been received, at step 182 distance counter 148 is incremented. It will be appreciated by those skilled in the art that distance counter 148 could also be decremented from the reference value. Control then returns to step 178 and steps 178, 180 and 182 iterate until step 178 detects a trigger signal.

If step 178 determines that a trigger pulse has arrived, at step 184 a product cook procedure is selected from cook procedures 146 based on the count value of distance counter 148 as of the arrival of the trigger pulse. At step 186 the selected cook program is executed. When step 186 is completed at step 188 upper platen 32 is returned to its non-cooking position. To perform step 188, processor 130 provides one or more command signals via I/O module 132 to motor controller 64 to provide drive current to motor 56. This causes positioning mechanism 40 to raise upper platen 32 from its cooking position to its non-cooking position.

More specifically, step 184 matches the trigger count value of distance counter 148 with count values for different product thicknesses for the food products stored in product thickness list 144. That is, each count value stored in product thickness list 144 is indicative of a corresponding product thickness of the food product of a corresponding cook procedure. If the trigger count value of distance counter 148 is in-between two of the count values in product thickness list 144, the count value closest to the trigger count value is used to select a corresponding cook procedure from cook procedures 146.

In an alternate embodiment, product thickness list 144 stores a thickness window for the product of each cook procedure. The thickness window is defined by an upper and a lower count value plus or minus a tolerance. The thickness window within which the trigger count value falls is used to select the corresponding cook procedure from cook procedures 146. If the trigger count value falls between two thickness windows, the closest thickness window is used. For example, the predetermined thickness could be 0.500±0.060 inch.

During a programming operation, product thickness list 144 and product cook procedures 146 are populated with respective thickness count values and cook procedures for the food products that are to be cooked with food cooking apparatus 20. The thickness count values and cook procedures can be entered, for example, via a keyboard or other input device (not shown) either via a wired connection or a wireless link.

Referring to FIG. 9, an alternate embodiment of the cook cycle program responds to the trigger signal to execute a cook procedure that is pre-selected by the operator, for example, from user interface 68. A cook cycle program 200 begins at step 202 by starting a cook cycle. Step 202 is performed in response to the operator activating activation button 60. At step 204 cooking apparatus 20 is initialized. For example, heating elements 28 are turned on and other preliminary operations (not germane to the present invention) are performed.

At step 206 motor 56 is started. Processor 130 provides one or more command signals via I/O module 132 to motor controller 64 to provide drive current to motor 56. This causes positioning mechanism 40 to lower upper platen 32 from its non-cooking position. At step 208, there is a determination of whether a trigger signal has been received from the detector (70, 80, 110, 110 or 120). If not, then step 208 repeats. If step 208 determines that a trigger signal has been received, then at step 208 the pre-selected cook procedure is executed. When the pre-selected cook procedure has been completed, then at step 212 upper platen 32 is returned to its non-cooking position. Processor 130 provides one or more command signals via I/O module 132 to motor controller 64 to provide drive current to motor 56. This causes positioning mechanism 40 to raise upper platen 32 from its cooking position to its non-cooking position.

The present invention having been thus described with particular reference to the preferred forms thereof, it will be obvious that various changes and modifications may be made therein without departing from the spirit and scope of the present invention as defined in the appended claims.

What is claimed is:

1. A cooking apparatus comprising: a first platen and a second platen disposed in spaced apart relationship to one another; a positioning mechanism that moves said second platen toward and/or away from said first platen; a detector disposed to provide a signal as said second platen makes contact with a food product disposed on said first platen; a float mechanism that provides a movement of said second platen toward and/or away from said first platen while in contact with said food product; and a controller that responds to said signal to move said positioning mechanism and/or said second platen into a cooking position in relation to said food product, and that, based on a cook procedure, causes an additional predetermined movement to said second platen toward and/or away from said first platen.

2. The cooking apparatus of claim 1, wherein said detector comprises a device that is selected from the group consisting of: micro switch, proximity sensor, touch sensor, strain sensor, thermal sensor, optical sensor and sonar sensor.

3. The cooking apparatus of claim 1, wherein said second platen stops upon contact with said food product, and wherein a motion of said positioning mechanism continues after said second platen stops due to initial contact with said food product.

4. The cooking apparatus of claim 3, wherein the continued motion of said positioning mechanism is due to said float mechanism.

5. The cooking apparatus of claim 4, wherein said float mechanism comprises a fastener that connects said positioning mechanism and said second platen in a manner that provides said continued motion.

6. The cooking apparatus of claim 1, wherein said detector is disposed on said positioning mechanism, said second platen and/or a support of said first platen.

7. The cooking apparatus of claim 1, wherein said positioning mechanism comprises a member that connects with said second platen, and wherein said detector is a proximity sensor disposed on said member.

8. The cooking apparatus of claim 1, wherein said positioning mechanism comprises a motor responsive to said controller to move said second platen, and wherein said detector provides said signal in response to a change in load on said motor.

9. The clam grill apparatus of claim 8, wherein said motor is an electric motor, and wherein said detector comprises a sensor disposed to monitor a motor current of said motor and provide said signal in response to a change of said motor current.

10. The cooking apparatus of claim 1, wherein said signal is provided when said second platen is moved toward said first platen by said positioning mechanism.

11. The cooking apparatus of claim 1, wherein said cooking apparatus is a clam grill.

12. The cooking apparatus of claim 1, wherein said controller that responds to said signal to move said positioning mechanism and/or said second platen into a cooking position at a first gap distance in relation to said food product, and that executes a cook program that includes a cook time and a second gap distance different than said first gap distance and that controls said positioning mechanism to make an additional predetermined movement to said second platen toward and/or away from said first platen to said second gap distance.

13. A cooking apparatus comprising: a first platen and a second platen disposed in spaced apart relation to one another; a positioning mechanism that moves said second platen toward and/or away from said first platen and into contact with a food product disposed on said first platen; a float mechanism that provides a movement of said second platen toward and/or away from said first platen while in contact with said food product; and a controller that responds to said second platen making said contact with a food product disposed on said first platen when said second platen is moved by said positioning mechanism toward said first platen to recognize said food product due to its thickness, selects one of a plurality of cook procedures corresponding to said recognized food product and, based on said selected cook procedure to cause an additional predetermined movement to said second platen toward and/or away from said first platen.

14. The cooking apparatus of claim 13, wherein said recognized thickness is derived from a travel distance of said second platen.

15. The cooking apparatus of claim 14, wherein said travel distance is derived from a predetermined reference point and a non-cooking position of said second platen.

16. The cooking apparatus of claim 13, further comprising a detector disposed to provide a signal as said second platen, when moved by said positioning mechanism toward said first platen, makes contact with said food product disposed on said first platen, and wherein said controller responds to said signal, thereby recognizing said food product.

17. The cooking apparatus of claim 13, wherein said controller matches said recognized thickness with a corresponding thickness of a plurality of predetermined thicknesses and selects said cook procedure based on said match.

18. The cooking apparatus of claim 17, if said recognized thickness is in-between two of said predetermined thicknesses, said controller selects one of said two predetermined thicknesses that is closest to said recognized thickness.

19. The cooking apparatus of claim 17, wherein said predetermined thicknesses is comprised of a plurality of thickness windows, and wherein said controller matches said recognized thickness to one of said thickness windows, and wherein the controller uses the matched thickness window for selecting said cook procedure.

20. The cooking apparatus of claim 19, if said recognized thickness falls in-between two of said thickness windows, said controller uses that one of the two thickness windows that is closest to said recognized thickness for selecting said cook procedure.

21. The cooking apparatus of claim 13, wherein said controller responds to said signal to move said positioning mechanism and/or said second platen into a cooking position at a first gap distance in relation to said food product, executes said selected cook procedure that includes a cook time and a second gap distance different than said first gap distance, and controls said positioning mechanism to make an additional predetermined movement to said second platen toward and/or away from said first platen to said second gap distance.

* * * * *